Jan. 28, 1969

R. R. WALTON 3,423,965

WASHING MACHINE

Filed July 6, 1966

INVENTOR.
RICHARD RHODES WALTON

BY
Strauch, Nolan, Neale,
Nies & Bronaugh
ATTORNEYS

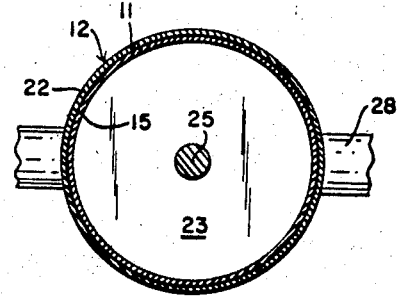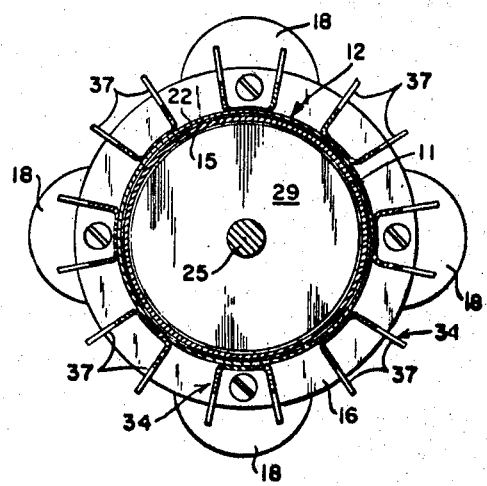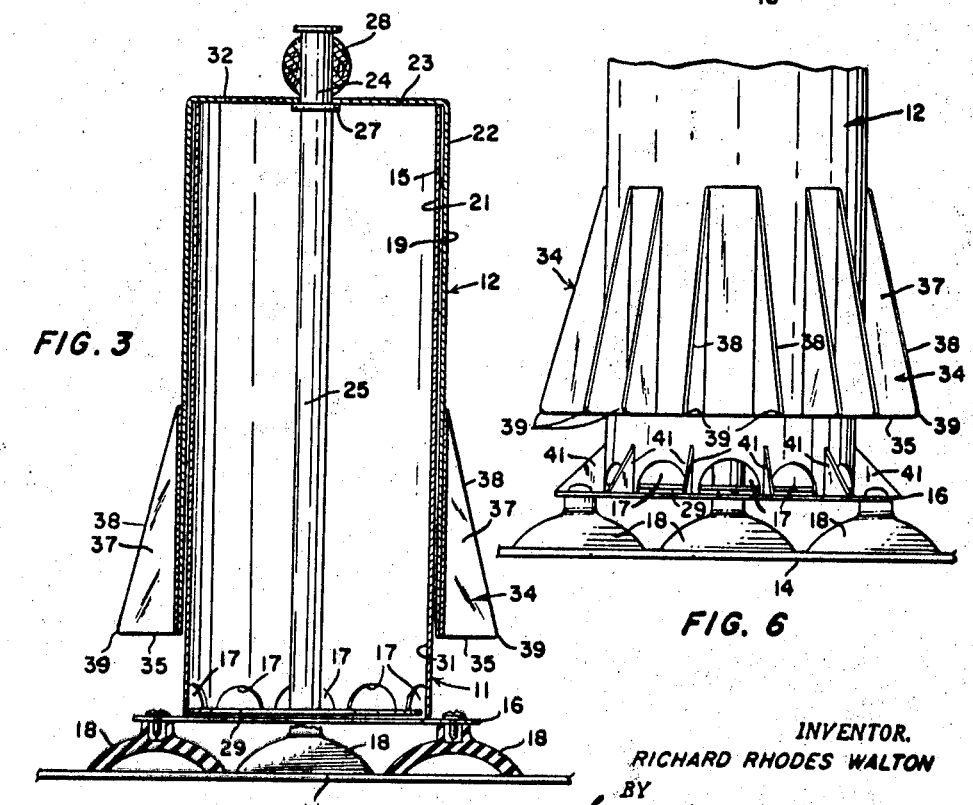

Jan. 28, 1969  R. R. WALTON  3,423,965
WASHING MACHINE

Filed July 6, 1966

INVENTOR.
RICHARD RHODES WALTON
BY
ATTORNEYS

Jan. 28, 1969

R. R. WALTON 3,423,965

WASHING MACHINE

Filed July 6, 1966

INVENTOR.
RICHARD RHODES WALTON
BY
Strauch, Nolan, Neale, Nies + Bronaugh
ATTORNEYS

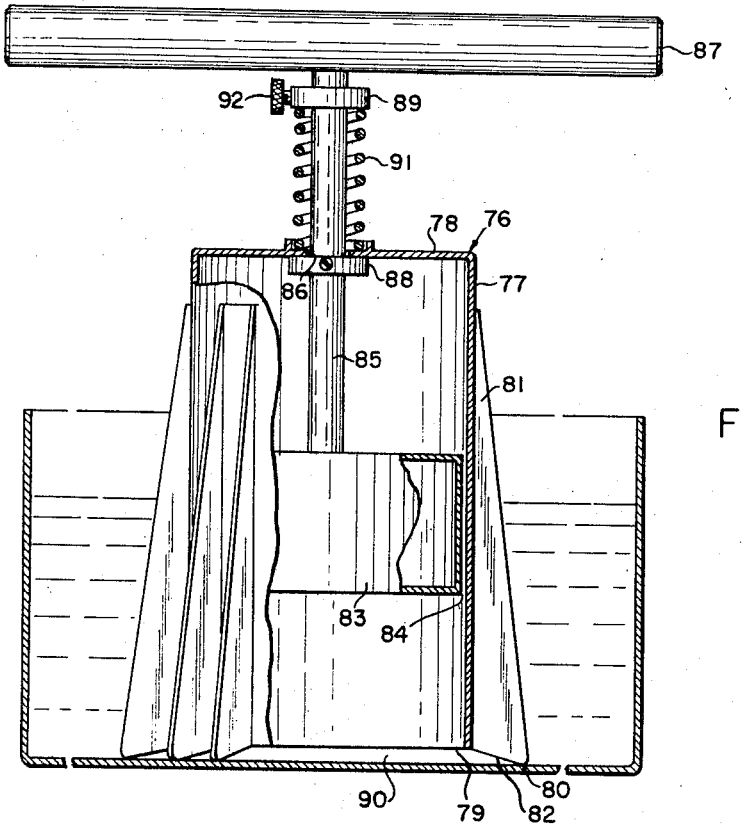
FIG. 16
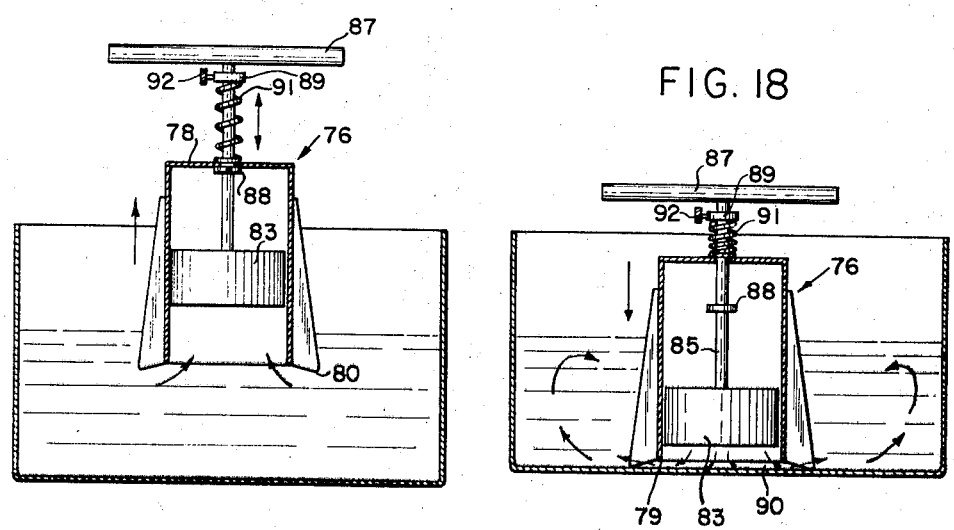
FIG. 17
FIG. 18

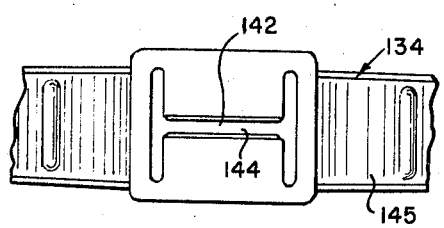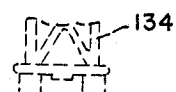

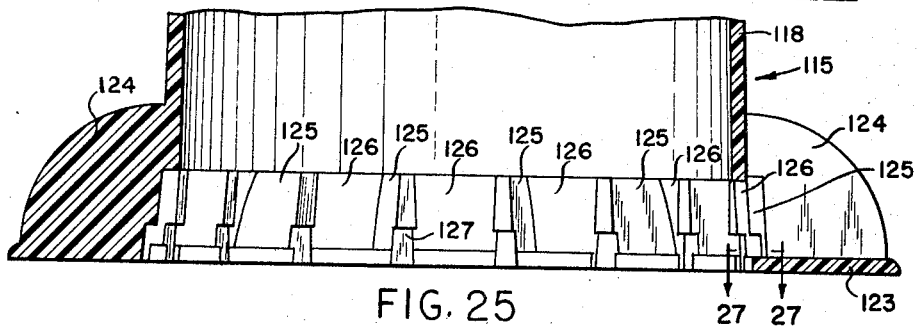
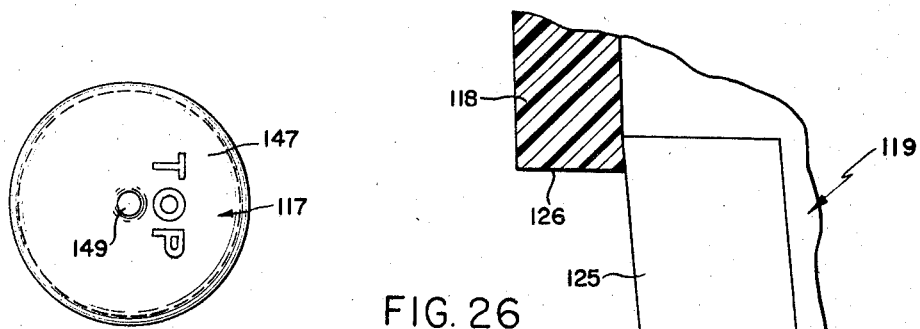
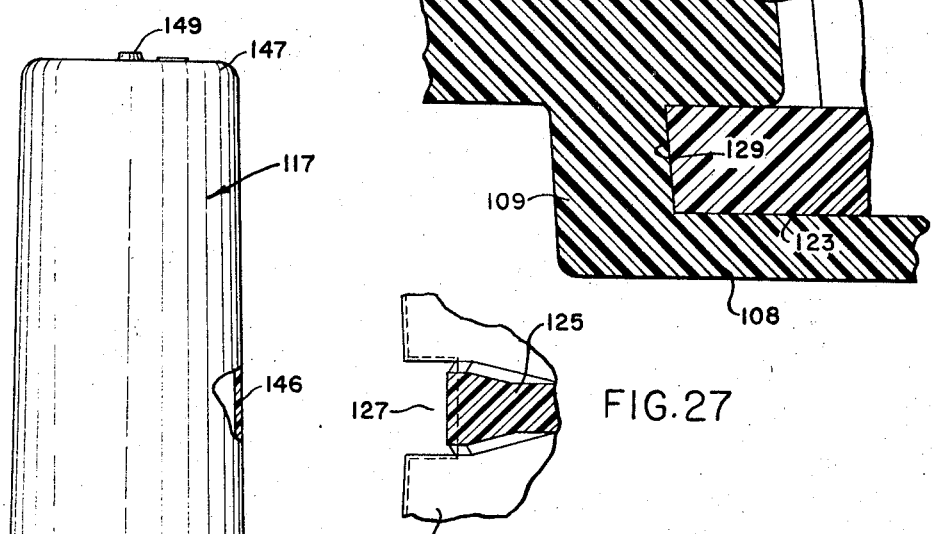

3,423,965
WASHING MACHINE
Richard Rhodes Walton, Boston, Mass., assignor to Colgate-Palmolive Company, a corporation of Delaware
Continuation-in-part of application Ser. No. 512,310, Dec. 8, 1965. This application July 6, 1966, Ser. No. 563,117
U.S. Cl. 68—38             26 Claims
Int. Cl. D06f *13/04, 15/00*

---

ABSTRACT OF THE DISCLOSURE

A clothes washing machine comprises a cylinder unit having a detachable upright mounting in a body of wash water in a container where it is surrounded by clothes to be washed. The cylinder unit is laterally apertured for water intake and discharge at its lower end and an agitator unit is reciprocably mounted on the cylinder unit to provide movement of water into the cylinder unit during the upstroke and discharge of water forcibly outwardly through said apertured portion during the downstroke, and a plurality of circumferentially spaced laterally outwardly extending inclined edge clothes engaging fins at lower end of said agitator unit combine with the water movement to subject the clothes to a related combination of mechanical and hydraulic forces during the washing action.

---

This is a continuation-in-part of copending application Ser. No. 512,310 filed Dec. 8, 1965 for Washing Machine and Method.

This invention relates to clothes washing machines and particularly to washing machines of the reciprocating agitator type embodying improved construction and a novel mode of operation.

Clothes washing machines of the type wherein the washing energy is introduced through a reciprocable agitator or the like have long been known and many different structural embodiments have been built and used ever seeking improved washing efficiency. One major difficulty encountered in many of these earlier machines was the tendency of the clothes to become tangled or otherwise accumulated in a tight mass, and in many other machines insufficient energy was imparted during the agitator movement to effect washing within a reasonable time.

The present invention represents a solution of many of the problems that existed in the earlier machines and provides a clothes washing machine wherein the clothes are always maintained in a non-tangled loosely associated relation and the reciprocable action is effective to produce optimum relative movement between the wash water and the clothes.

More specifically the present invention provides a clothes washing machine of novel construction which may be firmly mounted in a tub or available container and embodies a special reciprocable agitator unit that during operation effects jet discharge of wash water in combination with related controlled mechanical action on the clothes mass, and preferred constructions for effecting this action will be described. In some embodiments a novel combination of the machine and a tub is provided.

The invention comprises basically the novel combination of mechanical and hydraulic actions applied to a toroidal mass of clothes lying in wash water within a suitable container wherein a continual rotation of the clothes mass in a given direction about the annular axis of the toroid is caused by periodically applying a relatively strong mechanical thrust force directly to the clothes at the inner surface of the toroidal mass and applying correlated alternate strong and weak hydraulic forces to the clothes mass, said strong hydraulic force comprising the periodic discharge of wash water forcefully outwardly from within the toroidal mass adjacent the bottom of said mass to induce circulation of wash water in the direction of rotation of said mass during said period of strong mechanical thrust, and said weak hydraulic force comprising the periodic intake of water gently inwardly within the toroidal mass from the wash water adjacent the bottom thereof. The term continual includes both continuous and intermittent movement of the mass in the given direction.

The preferred structural mode of carrying out the invention includes an agitator having external projecting clothes contacting fins, said agitator being vertically reciprocable upon a cylinder that is disposed generally centrally of the clothes mass within the wash water and has apertures of fixed size at its lower end for alternate discharge and intake of said wash water. In certain embodiments the cylinder contains a piston that reduces the physical effort necessary for the upstroke of the agitator.

The cylinder acts to segregate a body of water within the annular clothes mass, and during the upstroke of the agitator pressure is reduced on the segregated body of water so that water from the container flows gently into the lower end of the body. At the same time during the upstroke of the agitator the fins apply a relatively weak upward, and also outward where the fins are inclined, mechanical thrust at the inner periphery of the clothes mass during the pressure reduction. During the downstroke of the agitator, the fins apply a relatively strong downward mechanical thrust to push the interior of the toroidal mass of clothes downwardly at one point to directionally rotate the mass about its annular axis while at the same time applying a forceful direct pressure on the segregated body of water within the cylinder to provide a strong hydraulic force that acts at another point to help rotate the mass in the same direction but usually with less force. During the return stroke of the agitator, the gentle intake of wash water into the cylinder takes place without appreciable effect on the rotation of the clothes mass.

Another object of the invention is to provide a novel washing machine embodying the foregoing structure features and mode of operation.

The foregoing operation is efficient and produces a remarkably good clothes washing action even though the manual reciprocation of the agitator is random and/or slow, the high speeds of reciprocation hitherto considered necessary where motor driven agitators were used in prior machines being no longer important.

It is another object of the invention to provide a clothes washing machine of the reciprocable agitator type wherein water circulation and mechanical action are combined in a novel manner for efficient washing.

Another object of the invention is to provide a novel reciprocable agitator type washing machine and method wherein the clothes are maintained in a loose non-entangled mass during the entire washing operation.

Another object of the invention is to provide a novel reciprocable agitator type washing machine comprising a cylinder unit adapted to be affixed in upright position within an available container of wash water and an agitator unit reciprocable externally on the cylinder unit adapted to effect jet discharge of wash water from the lower end of the cylinder to produce predictable washing action currents in the water and structurally defining as by external fins a related tucking zone for associated direct mechanical action on the clothes mass being moved in the water currents.

Another object of the invention is to provide a novel reciprocable type washing machine of the foregoing type embodying an agitator plunger unit having external clothes engaging fins reciprocable upon a relatively fixed cylinder containing a free piston.

It is another object of the invention to provide a novel reciprocable type washing machine wherein an upright cylinder unit having fixed size apertures in its lower end for alternate water intake and discharge is adapted to be firmly mounted upright in a wash water container, and an agitator unit having external outwardly extending clothes engaging fins is slidably mounted on the cylinder unit. Related objects of the invention include more specific structures as defined in the accompanying claims.

Further objects of the invention will appear as the description proceeds in connection with the annexed claims and the appended drawings wherein:

FIGURE 3 is a side elevation mainly in section showing details of the machine of FIGURE 1;

Figure 1:
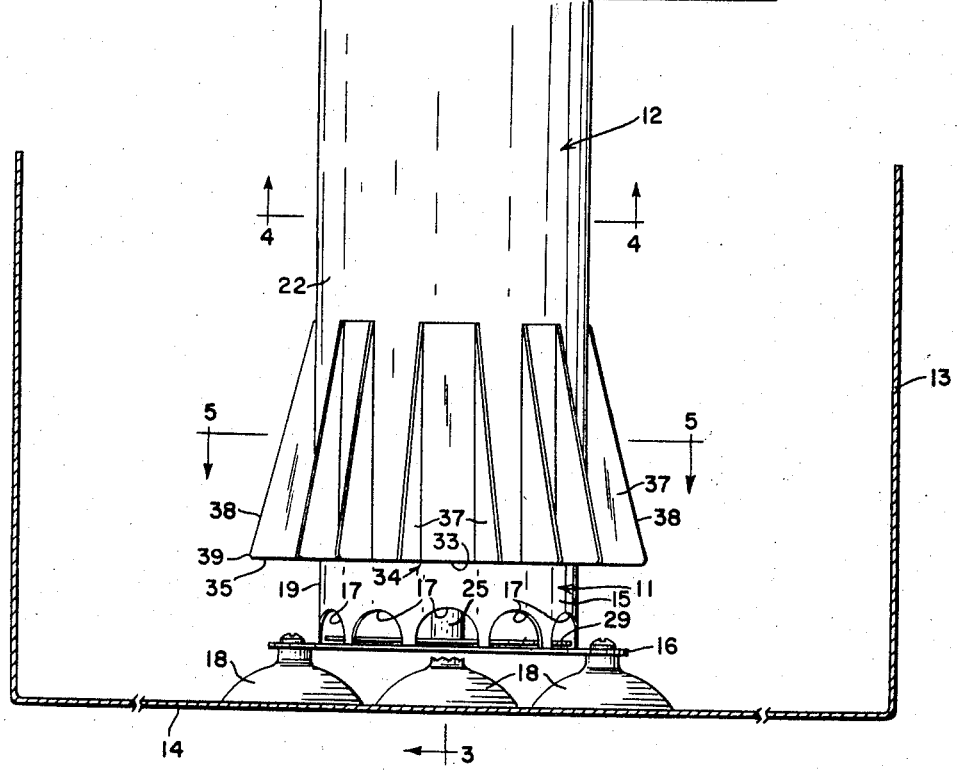
FIGURE 1 is a side elevation, partly in section showing a washing machine according to a preferred embodiment of the invention.
Figure 8:
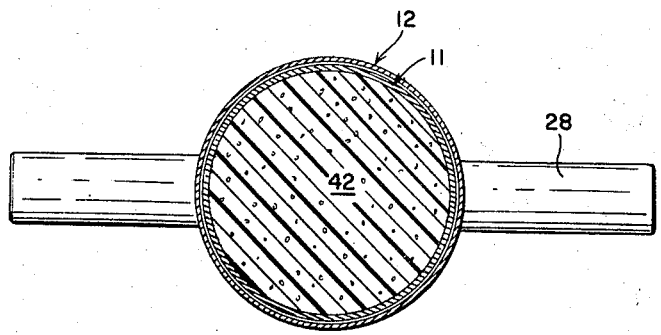
Figure 7:
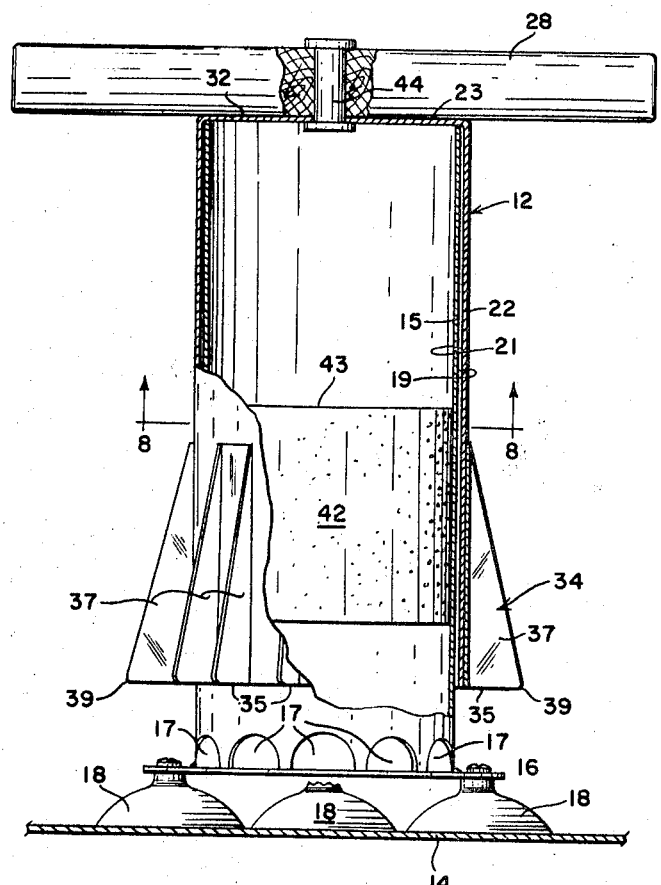
Figure 9:
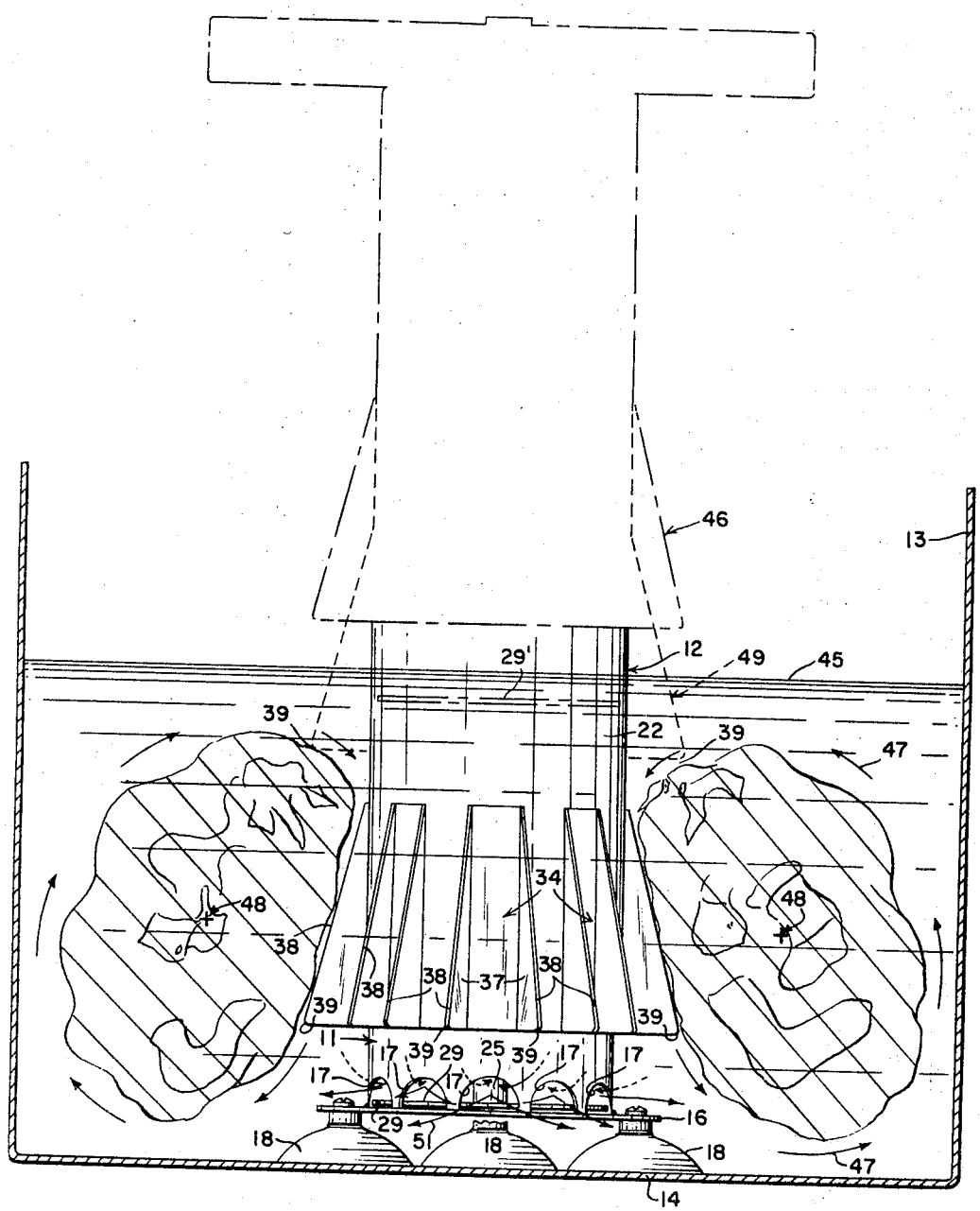
Figure 11:
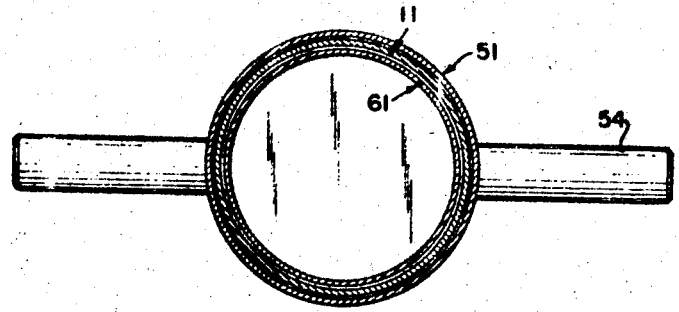
Figure 10:
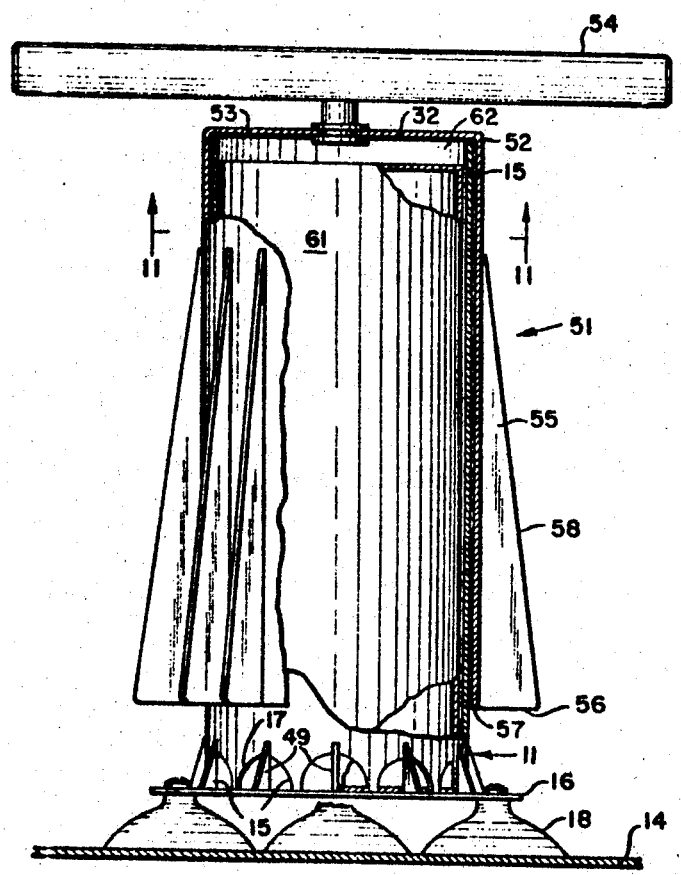
Figure 13:
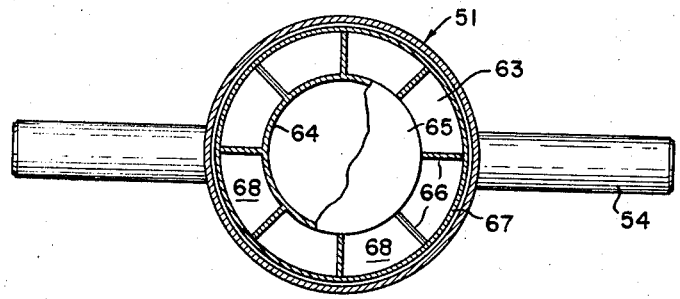
Figure 12:
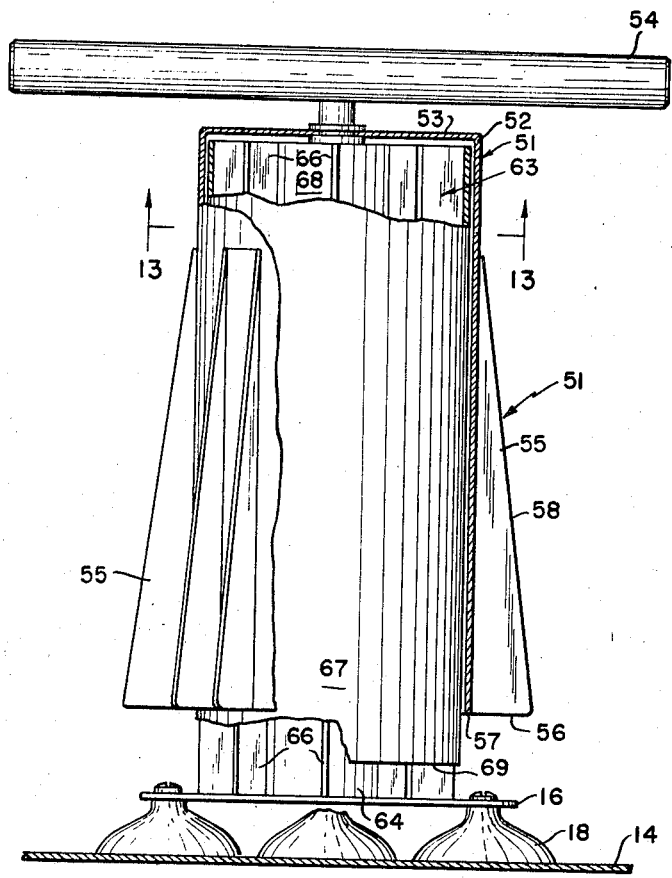
Figure 15:
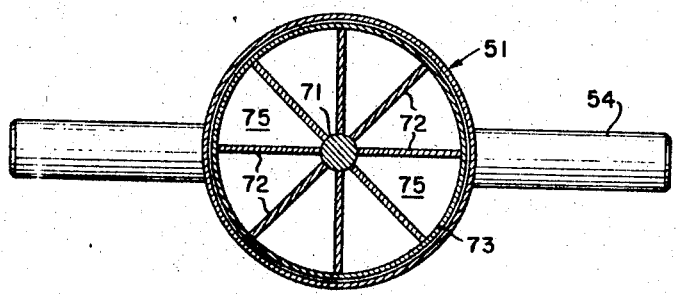
Figure 14:
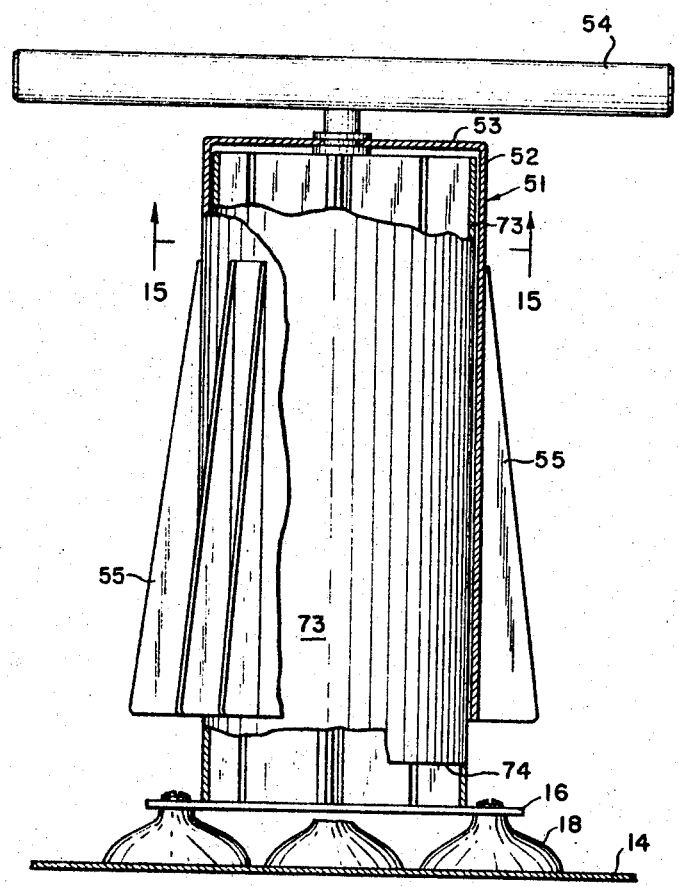
Figure 21:
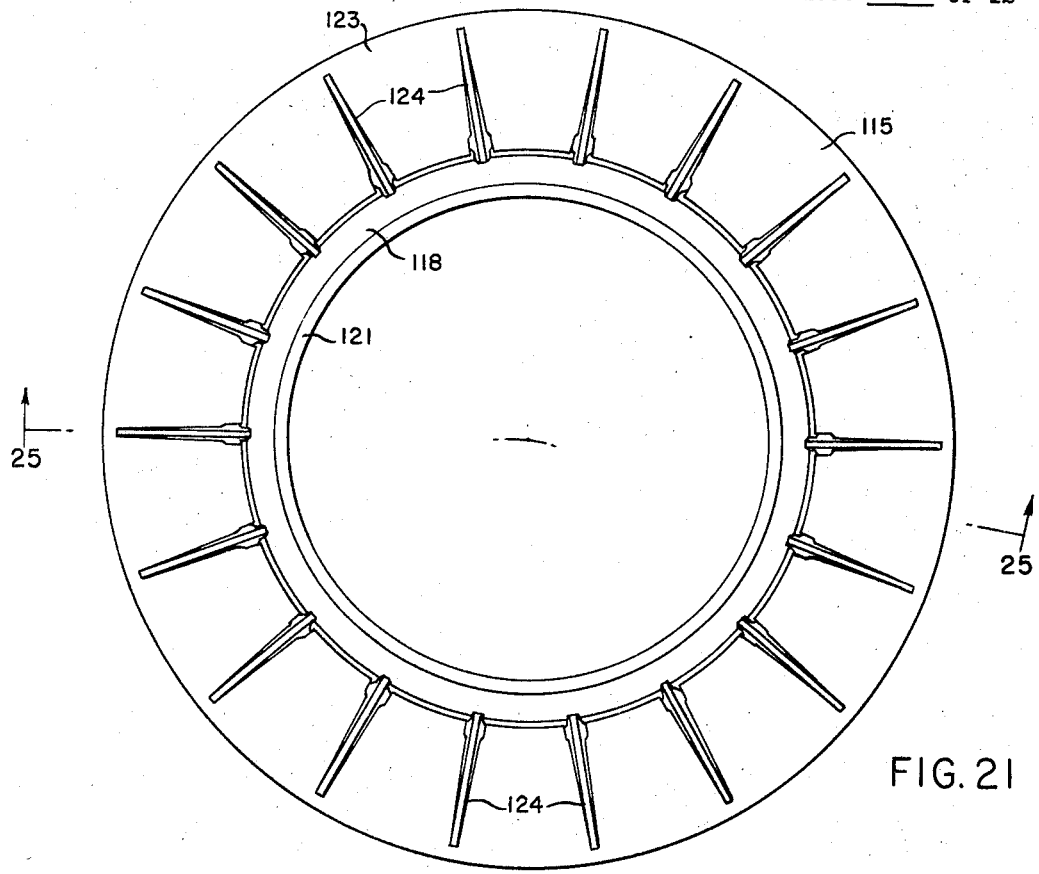
Figure 22:
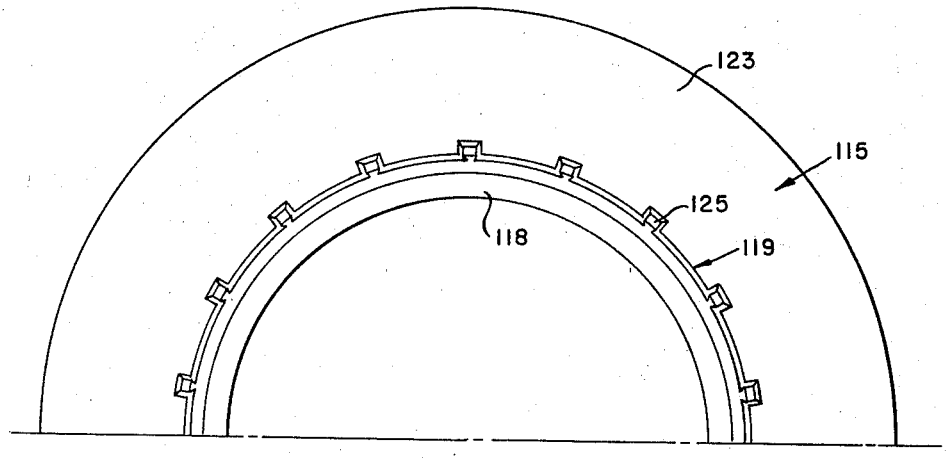
Figure 23:
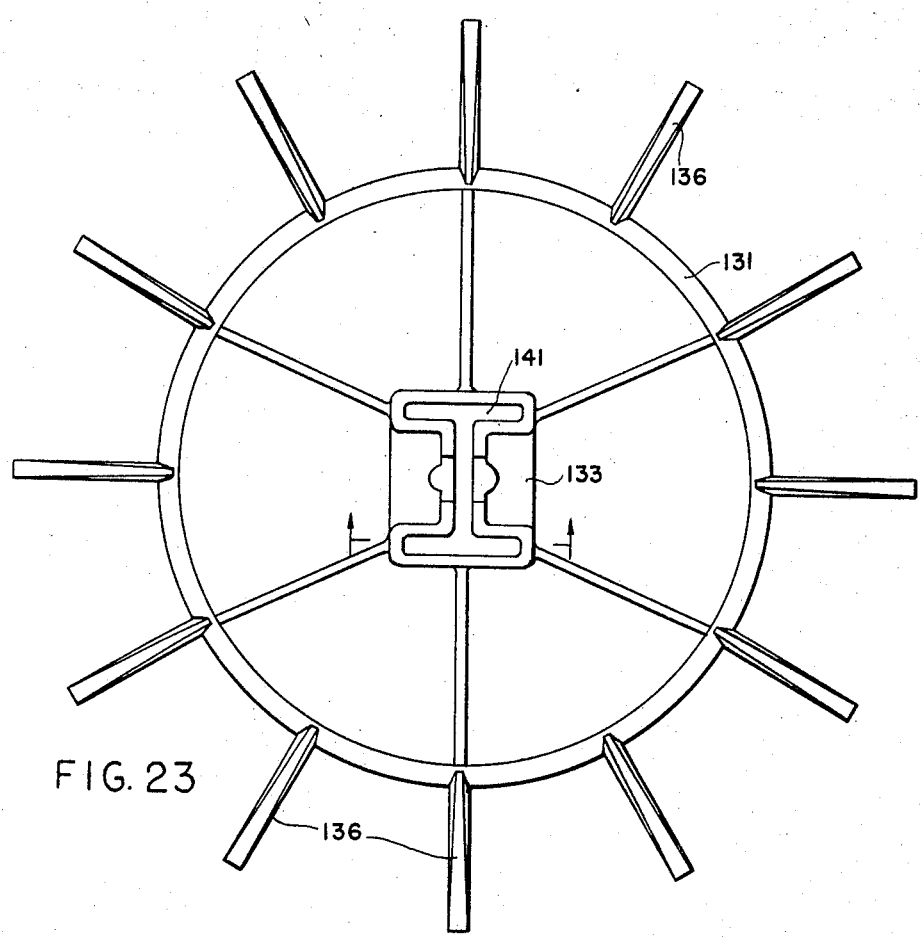
Figure 24:
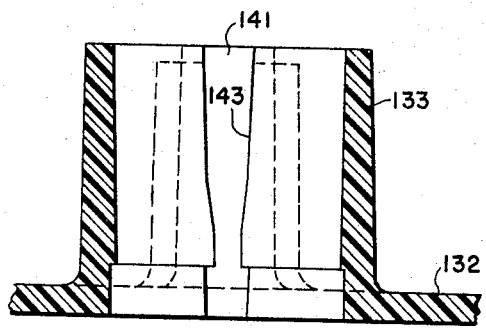

FIGURES 4 and 5 are sections on lines 4—4 and 5—5 respectively of FIGURE 1, showing further detail;

FIGURE 6 is a fragmentary side elevation showing the lower end of the machine according to a further embodiment;

FIGURE 7 is a side elevation partially broken away and in section showing a further embodiment wherein the cylinder contains a relatively free piston;

FIGURE 8 is a section on line 8—8 of FIGURE 7;

FIGURE 9 is a side elevation of the machine of FIGURES 1–8 showing the operation relatively diagrammatically;

FIGURE 10 is a side elevation partly broken away and in section showing a further embodiment of the invention in some respects similar to the form of FIGURE 7 but having a different free piston within the cylinder;

FIGURE 11 is a section substantially on line 11—11 of FIGURE 10;

FIGURE 12 is a side elevation partly broken away and in section showing a further embodiment of the invention;

FIGURE 13 is a section substantially on line 13—13 of FIGURE 12;

FIGURE 14 is a side elevation partly broken away and in section showing a still further embodiment of the invention;

FIGURE 15 is a section substantially on line 15—15 of FIGURE 14;

FIGURE 16 is a side elevation partly broken away and in section showing another embodiment of the invention;

FIGURES 17 and 18 are diagrammatic views illustrating the action of the parts in the FIGURE 16 embodiment;

FIGURE 19 is a side elevation partially broken away and sectioned showing a still further embodiment of the invention embodying a special association of cylinder, agitator and free piston, which may be mounted in a cooperating tub structure;

FIGURE 20 is a fragmentary bottom plan view of the agitator handle showing the I-shaped socket;

FIGURE 21 is a top plan view of the cylinder unit of FIGURE 19 apart from the assembly;

FIGURE 22 is a bottom plan half-view of the cylinder unit of FIGURE 21 showing the resilient socket for gripping the associated formation in the bottom of the tub;

FIGURE 23 is a top plan view of the agitator of FIGURE 22, showing the fin structure and the handle receiving socket;

FIGURE 24 is an enlarged fragmentary section showing the handle socket at the top of the agitator of FIGURE 22;

FIGURE 25 is a section substantially on line 25—25 of FIGURE 21 showing the water flow openings and the socket structure at the lower end of the cylinder unit;

FIGURE 26 is an enlarged fragmentary view in section showing a cylinder socket detail;

FIGURE 27 is an enlarged section substantially on line 27—27 of FIGURE 25;

FIGURE 28 is a side elevation partially cut away and sectioned showing the piston of FIGURE 19 apart from the assembly; and FIGURE 29 is a top plan view of the piston of FIGURE 28.

In a useful embodiment shown in FIGURES 1–7 the washing machine consists essentially of two detachable parts, a cylinder unit 11 and a relatively reciprocable agitator plunger unit 12. While in the form to be described herein each of these units is fabricated from sheet metal, it will be understood that each of them may be substantially integrally molded plastic parts. Further, while the machine will be described as manually operated the novel principles thereof may be applied to motor driven assemblies.

This washing machine is preferably used in a tub or like container such as indicated at 13 adapted to be filled to a desired level with water, but neither the type nor dimensions of such container are critical. Actually, it is essential only that this machine be used in an environment wherein a reasonably flat generally horizontal surface such as the tub bottom 14 is available for supporting the cylinder unit, and this could even be the bottom of a concrete irrigation ditch or a flat rock in a river pool. The lateral confinement afforded by a tub is however conducive to more efficient faster washing action with no loss of detergent.

The cylinder unit 11 comprises an upright hollow cylindrical column 15 that has its lower end axially closed by a flat plate 16 fixed to it as by solder or welding. Adjacent the juncture of column 15 and plate 16 the column is formed with a series of similar apertures 17 that are preferably equally spaced around the periphery of the column.

The cylinder unit is anchored in upright position, as by a plurality of rubber suction cups 18 that are mounted on plate 16, preferably outwardly of the periphery of column 15 for stability. These suction cups grip the bottom surface 14 of the tub and hold the column 15 with its axis substantially vertical and with apertures 17 near the bottom of the tub.

The cylindrical peripheral surface 19 of column 15 is preferably smooth for close sliding fit with the smooth cylindrical internal surface 21 of agitator unit sleeve 22 that is telescoped over it in the assembly.

The upper end of sleeve 22 is closed by transverse wall 23 that has a center opening 24 to pass a piston rod 25 centered on the sleeve axis.

Rod 25 is rigidly secured to wall 23, as by a collar 27 engaging the underside of wall 23, and a handle element 28 rigid with rod 25 and held rigidly against the upper side of wall 23. Any suitable arrangement may be provided for rigidly securing rod 25 concentrically upon sleeve 22.

Upon the lower end of rod 25 is rigidly secured a piston 29 in the form of a circular flat plate extending at right angles to rod 25 and having its periphery disposed in freely slidable relation to the cylindrical inner surface 31 of column 15. At its lowermost position, determined here by abutment of wall 23 with the upper rim 32 of column 15, piston 29 is disposed adjacent the sleeve apertures 17.

Referring to FIGURES 1 and 3, it will be noted that piston 29 is located an axially fixed distance below the open bottom rim 33 of sleeve 22.

Figure 2:
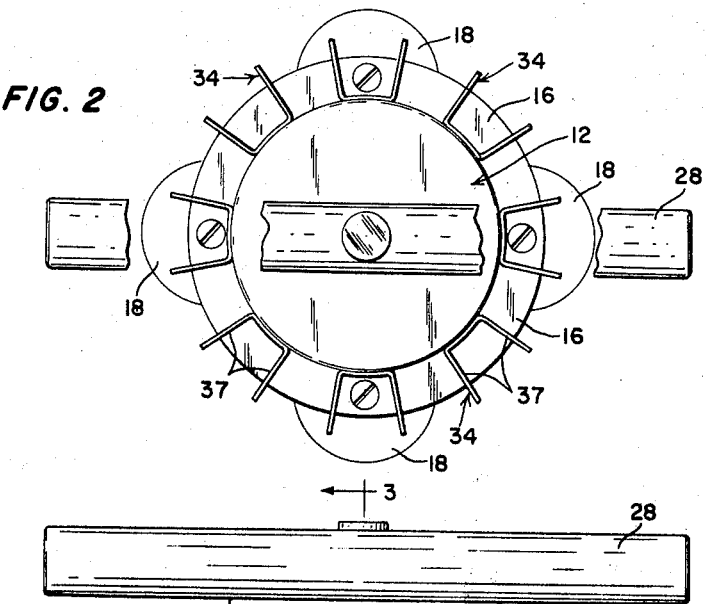
FIGURE 2 is a top plan view of the machine of FIGURE 1.

A plurality of external fin elements 34 are secured rigidly upon the lower end of agitator sleeve 22. These fin elements are preferably equally distributed circumferentially about the sleeve at the same level with their lower edges 35 extending at right angles to the sleeve axis flush with rim 33. Each fin element 34 is preferably a longitudinal channel shape as shown in FIGURE 2, with the bridge 36 fixed upon the sleeve surface, as by soldering, and the substantially parallel channel sides constituting longitudinal fins 37 extending substantially radially outwardly of the sleeve. Fins 37 are equally spaced circumferentially of sleeve 22. As shown in FIGURE 1, the outer edge 38 of each fin 37 slopes upwardly and inwardly from lower edge 35 toward intersection with the sleeve surface at an angle of about 10°–15° in a preferred embodiment. Edges 38 may be straight or curved as desired.

The foregoing fin construction provides a minimum of area resistance to passage through the water during reciprocation of the agitator unit as will appear. The fin edges 35 and 38 intersect in tips 39 lying in a circular clothes tucking zone a predetermined distance radially outwardly of apertures 17 for a purpose to appear.

FIGURE 6 shows an embodiment which is like that of FIGURES 1–5 except that a series of radial shield ribs 41 are provided on the lower end of cylinder column 15 adjacent the apertures 17, which ribs provide an additional measure of safety in operation to prevent clothes from clogging apertures 17.

In the embodiment of FIGURES 7 and 8, the cylinder unit 11 is exactly the same as in FIGURES 1–5. While the agitator sleeve is a cylinder 22 slidable on cylinder column 15 and provided about its lower end with fins 37 as in FIGURES 1–5, piston rod 25 and piston 29 of FIGURES 1–5 are replaced by a lightweight free piston 42 within the cylinder, piston 42 having a lower specific gravity than water. Piston 42 is preferably a cylindrical block of lightweight plastic foam such as polyurethane having a water tight surface skin 43, disposed in free sliding fit within the column 15. Handle 28 is suitably affixed to the upper sleeve wall 23 as by the rivet 44.

All of the embodiments are preferably similarly proportioned and function similarly in operation which will now be described in connection with FIGURES 1 and 9.

The assembly consisting of the cylinder and agitator units is placed in a suitable container 12 so that suction cups 18 securely grip bottom wall 14 and thereby mount cylinder column 15 rigidly upright within the container in spaced relation to the container walls. The container need not be of regular shape, nor need the washing machine be centered in it but these conditions are desirable.

The container is filled with water to a desired level, indicated at 45 in FIGURE 9 as above the fins 37 when the agitator unit is in its lowermost position, and a suitable amount of soap or detergent added to it. The cylinder unit 11 acts to confine a segregated body or column of water within it having a height at least equal to the height of the remaining water in the container. The clothes to be washed are placed in the container where they float in a loose annular mass around the washing machine. Now the washing process can be started.

The operator grasps handle 28 and reciprocates the agitator unit 12 up and down in a natural rhythm substantially that of scrubbing clothes on a washboard. At the beginning of the upstroke, piston 29 is at the level of apertures 17. As the agitator is raised, water flows into the lower part of the segregated body through apertures 17 as indicated by the dotted line arrows in FIGURE 9 and increases its volume. This inward flow is relatively gentle and due partly to gravity because of the head of water in the container as pressure on the upper surface of the segregated body of water within the cylinder is reduced and partly to suction in the lower end of the cylinder due to the rising agitator unit. The upper limit of the stroke is preferably just above the water line in the chain line position of the unit indicated at 46 in FIGURE 9. At this time the piston is located substantially as indicated at 29' in FIGURE 9 with the increased height of the body a considerable volume of water below it within the cylinder unit.

During the upstroke of the agitator the inclined fin surfaces 38 engage the inner periphery of the clothes mass and apply a relatively weak outward and upward mechanical thrust that accompanies the period of pressure reduction on the segregated body of water and aids in maintaining the continual rotation of the mass about its annular axis as will appear.

On the downstroke the agitator applies direct pressure on the segregated body of water and forcibly expels water from the segregated body within the cylinder through apertures 17 as a circumferentially spaced series of radially outwardly directed high velocity jets which tend to create within the container wash water predictable water circulation currents indicated by arrows 47 in FIGURE 9 tending to flow in a toroidal path disposed about the axis of the washing machine, these currents applying relatively strong hydraulic forces to the clothes mass tending to move the lower portions of the clothes mass outwardly toward the container walls and the upper portions of the clothes mass inwardly toward the piston sleeve, whereby the clothes in the mass tend to revolve about a ring shaped general axis indicated at 48 in response to water circulation within the container while maintaining their loose non-tangled association.

During the downstroke, when the agitator unit reaches the dotted line position indicated at 49 in FIGURE 9, the fin tips 39 defining the annular tucking zone engage the upper inner periphery of the toroidal mass of clothes and directly exert a strong mechanical downward thrust force at the inner surface of the mass which, acting in association with the radially expelled jets 51 (FIGURE 9) from the bottom of the cylinder unit but usually with a force greater than that imparted by the jets tends to move the clothes mass about the ring axis 48. The fins 34 and the jets 51 thus act in association on peripherally spaced regions around the toroid periphery to provide an amplified turning action. During this time the combined forces exerted by the fins and jets tend to maintain the lower portion of the mass well spaced outwardly of apertures 17 and the upper portion of the mass tends to close in on the sleeve 22 near the upper ends of fins 37. Since the fins are longitudinal they slide through the water without resistance and without affecting the jet created currents in the wash water.

By the time that the agitator unit has reached its lowermost position indicated in full lines in FIGURE 9, the toroidal clothes mass is disposed substantially as shown in FIGURE 9 as a result of the foregoing action.

On the upstroke wherein water is drawn into the cylinder through apertures 17, the water currents within the container are reversed but the intake flow is diffused evenly and does not have the jet velocity of the expelled water. Moreover the fins have so outwardly maintained the clothes mass that the clothes do not move into clogging relationship with apertures 17 and do not impede charging of the cylinder with water during the upstroke of the agiator unit.

In effect therefore as the agitator unit reciprocates on the piston the loose pulsating clothes mass gradually moves about ring axis 48 in the direction of arrows 47 because of the strong combined jet and plunger thrust during the downstroke.

I have noted by actual observation that during the entire washing operation the toroidal mass of clothes remains remarkably loosely related in its components, so that the repeated motions imparted thereto by reciprocation of the piston member continually flex the clothes in the water for maximum efficiency of washing action. The clothes never tend to wind into tight annular rings or to gradually move into clogging relation with the cylinder intake apertures, and so the invention has overcome such difficulties in prior machines of the reciprocating type. I attribute this beneficial operation to the combined actions of the expelled high velocity water jets which provide the necessary water currents within the container and the fins movable with the agitator which contribute the primary mechanical thrust force to cooperate in balanced relation with the jets to maintain clothes movement and position, but yet avoid packing the clothes into tight masses.

In the embodiment of FIGURES 7 and 8 the operation is essentially the same, with floating piston 42 moving up and down within the cylinder as agitator sleeve 22 is reciprocated. Piston 42 is displaced upwardly due to the combined action of the water head and suction in the cylinder above it, and the piston is displaced downwardly by the compressed air column developed in the cylinder above it during the downstroke.

In general the different parts of the apparatus may be relatively proportioned for different washing action and the dimensions are usually correlated to the energy exerted by the operator. I have found that by increasing both the cylinder and agitator diameters less effort is required for reciprocating the piston unit, and a further reduction in effort is obtained by increasing the size of apertures 17 at the same time. I have also found that by increasing the diameter of the tucking zone of tips 39 further reduction of effort is obtained. The foregoing is particularly applicable to manual washing machines wherein the agitator stroke is about 8–10 inches, the cylinder diameter is about six inches, and the tucking zone is located about one inch outside the sleeve surface. It will be understood in general that all corners, edges and parts that may encounter the clothes are rounded to avoid snagging.

FIGURES 10 and 11 illustrate another free piston embodiment of the invention. In FIGURE 10 the cylinder unit 11 is the same as in FIGURES 1 and 3 except that external ribs 49 are provided bridging each aperture 17 to aid in preventing the loose clothes from clogging apertures 17 during the upstroke of the agitator. The agitator unit 51 comprises a tubular sleeve 52 externally surrounding and slidable on the cylinder column 15 and having a closed top wall 53 to which is centrally fixed a handle 54. A plurality of external fin elements 55 are fixed upon the outer periphery of agitator sleeve 53, the lower wider edges 56 of the fins being level with the lower rim 57 of sleeve 52, and straight edges 58 tapering toward the upper end of the agitator. In this embodiment the fins are much longer coaxially of the agitator than in the previous embodiments for earlier engagement with the clothes ring during the agitator upstroke.

Within the cylinder is loosely disposed a free water tight hollow piston 61 which is a thin-walled metal or plastic unit whose cylindrical periphery has a suitable clearance (about ¼ of an inch) with the inner wall of the cylinder. The piston 61 is of such length that when the agitator is in its lowermost position and the piston is resting on plate 16 a suitable free space 62 exists between the piston top and the upper wall 53 of the agitator.

During reciprocation of the agitator unit 51 on the cylinder, water from the tub enters and leaves through openings 17 in the general manner above described in connection with FIGURE 9. It has been found that floating piston 61 very closely follows agitator movement, readily moving up and down within the cylinder as the agitator reciprocates, and this arrangement is highly advantageous in producing a very strong outward velocity component to the water during the downward charge stroke of the agitator.

FIGURES 12 and 13 show another embodiment wherein the agitator 51 is essentially the same as in FIGURES 10 and 11, but the cylinder structure 63 is different. Cylinder 63 here comprises a central relatively small diameter column 64 closed by a top wall 65 and having a plurality of radial fins 66 disposed uniformly around its periphery. The outer edges of these fins lie in a cylindrical envelope near the inner periphery of agitator sleeve 52, and they may be free or enclosed within a thin cylinder wall shown at 67 in FIGURE 13. The spaces 68 between fins 66 are open top and bottom, and as shown in FIGURE 12, the lower edge 69 of cylinder wall 67 terminates sufficiently above plate 16 to provide water inlet and outlet openings for the spaces 68.

In this embodiment the cylinder spaces 68 are charged with water and discharged during agitator reciprocation, and the overall operation is similar to that described for FIGURE 9.

In the embodiment shown in FIGURES 14 and 15, the agitator 51 is essentially the same as in FIGURES 10–13, but the cylinder structure here comprises a central post 71 from which extend a plurality of straight radial fins 72. The lower end of post 71 is fixed centrally on plate 16, and the unit consisting of plate 16, post 71 and fins 72 may be an integral molded plastic part. As in FIGURES 12 and 13 the outer edges of the fins 72 may be surrounded by a thin cylinder wall 73 that terminates at 74 so as to provide water inlet and outlet openings for the spaces 75 between fins 72.

In operation as the agitator reciprocates, water is drawn into spaces 75 and expelled to provide the washing action described with reference to FIGURE 9.

FIGURE 16 shows a further embodiment wherein the machine is not attached to the tub but is relatively self-contained. This machine includes an agitator 76 comprising a cylindrical sleeve 77 having a closed top wall 78, and open bottom surrounded by rim 79, and external tapered fins 81 having their lower wider edges 82 inclined downwardly and outwardly from 79 to terminate in tips 80 lying essentially in a plane perpendicular to the sleeve axis.

A hollow water tight piston 83 is disposed within sleeve 77 with its periphery having a relatively large clearance 84 with the sleeve. A piston rod 85 fixed to the piston projects freely through opening 86 in top wall 78 to terminate in a handle 87. A collar 88 is fixed to rod 85 below wall 78, and a collar 89 is fixed on rod 85 well above wall 78. A coiled compression spring 91 extends around rod 85 between the top of wall 78 and collar 89, which is adjustable along rod 85 as by set screw 92.

Normally spring 91 biases the piston and rod assembly to the upper FIGURE 16 position wherein the machine is shown resting on the tub bottom. In use the machine is placed in a tub, for example, and reciprocated up and down substantially as shown in FIGURES 17 and 18, but the lower edge of the agitator sleeve is never raised above the water level in the tub. FIGURE 17 shows the machine at the start of the downstroke, and here spring 91 has displaced the piston up until collar 88 abuts wall 78. As the machine moves downward, fin tips 80 encounter the tube bottom and further downward pressure on handle 87 displaces piston 83 downwardly relative to the agitator to displace water out of the interior of the agitator cylinder through the space 90 below rim 79 in an arcuate path somewhat as illustrated in FIGURE 18. The fins 81 mechanically act on the inner side of the toroid of clothes in the same manner as the other embodiments.

FIGURES 19–29 illustrate an embodiment of the invention which is of great practical commercial value. This assembly consists of the washing machine 101 operating in a coacting tub 102 of optimum dimensions.

The tub 102 is an open top molded polyethylene unit having an upper rim that is reenforced by internal ribs 103 and a turned over lip 104 presenting an annular smooth surface 105 all around the open end of the tub. The tub side walls 106 slope inwardly slightly, and are rounded at the lower end at 107 to merge into a flat bottom wall 108. Centrally wall 108 is formed with an upwardly projecting shallow hollow central boss 109 providing within the tub an annular rounded bead 111 which as will appear provides for anchoring of the machine cylinder. Boss 109 is downwardly open except for several molded ribs 112 that engage the same support surface as the bottom wall 108. Boss 109 provides above bead 111 a flat surface 113 perpendicular to the tub axis, for a purpose to appear.

The machine 101 consists essentially of the cylinder 115, the agitator plunger 116 and the free piston 117, all integral molded units of polyethylene or the like, containing distributed pigment for color and ornamentation.

Cylinder 115 consists of an upright tubular sleeve 118 formed at its lower end with a flexible socket structure 119 adapted to snap over bead 111 when the cylinder is thrust axially downwardly onto boss 109. This anchors the cylinder firmly within the central portion of the tub during all normal washing action, but the socket is sufficiently flexible that the cylinder may be intentionally detached as for cleaning or repair.

It will be observed that sleeve 118 is frusto-conical, being of smaller diameter at its upper rim 121 than at its lower portion 122 where it merges into socket 119.

Socket 119 comprises a flat annular bottom rim 123 (FIGURE 25) adapted to seat on the bottom wall of the tub, and a series of equiangularly distributed short radial ribs 124 externally join rim 123 to sleeve wall 118. Referring to FIGURES 25 and 26, socket 119 comprises a series of circumferentially equally spaced vanes 125 that extend between the lower end of sleeve 118 and rim 123 at the inner sides of ribs 124 and define between them a series of laterally open water flow openings 126. Vanes 125 provide flexibility in the socket.

The inner edges of vanes 125 are formed with inwardly open notches 127 which are circumferentially aligned and have their upper surfaces 128 lying in a plane. As shown in FIGURE 26 the lower end of each notch is closed by the inner periphery of rim 123 which has an inclined inner edge 129.

Thus, when the cylinder 115 is thrust axially into the tub, the socket 119 is momentarily expanded as edge 129 cams over bead 111, and then when rim 123 seats on the tub bottom bead 111 snaps into notches 123 with surfaces 128 overlying the upper flat surface 113 of the boss. This provides a tight snug fit mounting of the cylinder centrally of tub 102, wherein surface 113 effectively closes the lower end of the cylinder unit.

Agitator 116 comprises an upright tubular sleeve 131 having a top wall 132 formed with a central boss 133 defining a socket for a removable handle 134. Sleeve 131 is frusto-conical with its larger lower open end surrounded by rim 135. The angle of inclination of the wall of sleeve 131 is preferably the same as that of the cylinder sleeve 118. A plurality of external radial fins 136, which slope from their lower widest edges 137 coplanar with sleeve rim 135 to a point about two-thirds up the sleeve wall, are equally circumferentially arranged around the lower end of the sleeve.

FIGURES 23 and 24 show the handle socket structure as defining an upwardly open I-shaped recess 141 in boss 133 that is adapted to receive the similarly I-shaped lower end 142 (FIGURE 20) of handle 134. As shown in FIGURE 24 the central part 143 of recess 141 is tapered inwardly, and the central web 144 of the handle end is similarly wedge shaped. The parts are so dimensioned and the flexibility of the plastic are such that when handle 134 is thrust into boss 133 the socket parts are tightly frictionally and non-rotatably united sufficiently to withstand separation during normal operation of the handle in reciprocating the agitator up and down in a tub containing the wash water and a change of clothes to be cleaned. Handle 134 is provided with one or more finger grip bars 145.

Disposed within cylinder 115 is the free piston 117 which is a hollow water tight molded polyethylene unit that is frusto-conical with its side wall 146 sloping from the closed top wall 147 to the closed bottom wall 148. The intersections of the side wall with the top and bottom walls are rounded to eliminate all sharp external projections on the piston. Top wall 147 has a central upwardly projecting button 149.

As shown in FIGURE 19, the axial length of piston 117 is such that at the lowermost stroke position of the agitator 116, the piston may rest on tub surface 113 with its upper end spaced from top wall 132 of the agitator.

As agitator 115 is reciprocated up and down during the clothes washing operation, the free piston 117 being buoyant will tend to move up and down closely following agitator movement with water entering openings 126 during the upstroke and being expelled with jet velocity through openings 126 during the downstroke.

In the FIGURE 19 solid line relationship of parts, the piston 117 has a substantial (about ⅛") peripheral clearance top and bottom with the cylinder 175. The diameter of piston 117 is however such that its upward displacement within the cylinder is limited to a predetermined amount as illustrated in FIGURE 19 which shows the agitator and piston in a dotted line raised position on the upstroke at the time that the larger diameter lower end of piston 117 encounters the same diameter interior of cylinder sleeve 118. Thus the lower portion of piston 117 is of larger diameter than the upper portion of cylinder 115, and this prevents the piston from being displaced upwardly out of the cylinder and inadvertently lost during shipping, storage and the like. In addition, this arrangement limits the amount of water that has to be lifted during the upstroke of the agitator, and this eases the work required to operate the machine without affecting its efficiency of washing.

During operation the clothes are arranged in a toroid within the tub around machine 101, and the combined actions of the radial water jets and the fins results in the essentially same washing operation as disclosed above in connection with FIGURE 9. In this embodiment the parts are all molded from substantially indestructible plastic such as a linear polyethylene which is resistant to corrosion and abrasion, and the wash water acts as a lubricant to enhance relative sliding between the engaged machine surfaces. There are no complex machine parts, and the machine and tub may be assembled and disassembled by unskilled operators within a few seconds. The tub diameter is chosen to provide the optimum control of water flow and clothes displacement for a given size washing machine.

In the embodiment of FIGURES 19–29 satisfactory results have been obtained using a machine about ten inches high with a cylinder diameter of about four inches and an agitator vane height of about six inches, operating within an eighteen inch diameter tub. The machine parts (agitator, piston and cylinder) are polyethylene with wall thickness of about two tenths of an inch and formed by molding.

In all of the embodiments of FIGURES 10, 12, 14 and 19 the mode of operation is essentially as described for the embodiment of FIGURES 1–9. The container is filled with water to a desired level as described and part of it flows into the cylinder and around the piston in the embodiments FIGURES 10 and 19 to about the same height the water reaches in the remainder of the tub. The upward stroke of the agitator supplemented by the rising piston in the embodiments of FIGURES 10 and 19, reduces the pressure on the segregated or confined body of water in the cylinder and results in an increase in its volume by gentle inward flow of water at the lower end of the body, this being accompanied by the relatively weak outward mechanical thrust of the fins acting directly on the clothes mass. On the downstroke the agitator supplemented by the piston where used, applies forceful pressure on the water to cause relatively high velocity outward flow from the bottom of the segregated body of water with strong hydraulic force producing toroidal water circulation, and this is accompanied by the fins applying a strong downward mechanical thrust directly to the inner periphery of the clothes mass. The clothes mass is thus rotated continually about its annular axis by the foregoing combined mechanical and hydraulic actions to provide an entirely new washing action that is very efficient even though the forces may be randomly applied.

In all of the foregoing embodiments reciprocation of the agitator is effected by the operator grasping a handle (28, 54, 145) and manually moving it up and down at the required amplitude and frequency. The invention also contemplates a power drive for the purpose in all embodiments, an electric or other motor being suitably disposed and connected to impart the required relative motion between the agitator and the cylinder and/or piston.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for washing clothes arranged in a generally annular mass within a container of wash water comprising means for segregating a body of wash water centrally within said annular mass having a height at least equal to the depth of said wash water in the remainder of said container, means for reducing the pressure on the upper surface of said body of water below the pressure on the remainder of said water to increase the volume of said segregated body by relatively gentle inward flow from the remainder of the water at the lower end of said body, means for preventing said clothes from blocking said inward flow of water, means for applying relatively strong direct downward thrust mechanically at the inner periphery of said annulus to move said clothes in a path about the annular axis of said mass, and means for applying forceful direct pressure on the segregated body of water to discharge water forcefully from the lower end of said segregated body toward the lower portion of said mass during said period of downward thrust to produce generally toroidal water circulation tending to augment movement of the clothes in said path.

2. A machine for washing clothes in a container adapted to hold a generally toroidal mass of clothing in wash water comprising an agitator having an open bottom and a closed top adapted to be reciprocated by an up and down movement within the inner opening in said toroidal mass, mechanical means on the outer periphery of said agitator adapted to engage the inner surface of said toroidal mass on the downstroke and impart a substantial downward component of motion and to slide past said mass without imparting any substantial upward component of motion on the upstroke, means responsive to movement of said agitator on the upstroke for inducing flow of water inwardly of said mass, means responsive to movement of said agitator on the downstroke for discharging water forcefully outwardly from within said toroidal mass at the lower part of said mass during the downstroke of said agitator to induce circulation of the wash water and combine with said mechanical means for the movement of the toroidal mass around the annular axis of the mass in a downward direction around the surface of its inner opening and in an upward direction around its outer surface, and means for preventing clothes from blocking inward flow of water during said upstroke of the agitator.

3. A machine for washing clothes in a container adapted to hold a generally toroidal mass of clothing in wash water comprising an agitator unit having an open bottom and a closed top adapted to be reciprocated by an up and down movement within the inner opening in said toroidal mass, mechanical means on the outer periphery of said agitator unit adapted to engage the inner surface of said toroidal mass on the downstroke and impart a substantial downward component of motion and to slide past said mass without imparting any substantial upward component of motion on the upstroke, and means responsive to movement of said agitatior unit for discharging water forcefully outwardly from within said toroidal mass at the lower part of said mass during the movement of the toroidal mass substantially around the annular axis of the mass in a downward direction around the surface of its inner opening and in an upward direction around its outer surface, said last named means comprising an upright cylinder which is laterally apertured at its lower end for said discharge of water and on which said agitator unit is reciprocably mounted and there being a free piston slidably mounted within said cylinder.

4. In a clothes washing machine, a cylinder unit adapted for upright mounting in a body of wash water where it is surrounded by clothes to be washed and being laterally apertured for water intake and discharge at its lower end portion, an agitator unit reciprocably mounted on said cylinder unit adapted to provide movement of water into the cylinder unit through the laterally apertured portion of said cylinder unit during the upstroke and discharge water forcibly outwardly through said apertured portion during the downstroke, and a plurality of circumferentially spaced laterally outwardly extending clothes engaging projections adjacent the lower end of said agitator unit whereby said clothes in the wash water are subjected to a related combination of mechanical forces exerted by said projections and hydraulic forces exerted by said relatively high velocity water discharge.

5. In the clothes washing machine defined in claim 4, said apertured portion of the cylinder unit comprising a plurality of circumferentially spaced openings at the lower end of said cylinder unit.

6. In the clothes washing machine defined in claim 4, said cylinder unit comprising a tubular member having means on its lower end for securing it removably to the floor of a wash water container or the like.

7. In the clothes washing machine defined in claim 6, said means for securing the cylinder unit to said floor being coacting detachable socket means on the cylinder unit and said floor.

8. In the clothes washing machine defined in claim 7, said socket means comprising at least one external projection on said tubular member adapted for releasable locking fit within a corresponding socket recess at said floor.

9. In the clothes washing machine defined in claim 4, said cylinder unit comprising a hollow tubular member and said agitator unit comprising a hollow tubular member telescoped with said cylinder tube, and said projections being mounted upon the lower end of said agitator member.

10. In the clothes washing machine defined in claim 9, said tubular member of the cylinder unit being a tube open at the top and said tubular member of the agitator unit being a tube closed at the top and enclosing the upper end of said cylinder unit.

11. In the clothes washing machine defined in claim 9, said tubular members being both similarly frustoconical with their lower ends of larger diameter.

12. In the clothes washing machine defined in claim 9, said tubular cylinder member having a frusto-conical inner surface of larger diameter at its lower end, and a frusto-conical free piston unit within said cylinder unit having its larger diameter at its lower end, the said larger diameter of the piston being smaller than the diameter of the upper end of said tubular cylinder member to prevent said piston unit from passing through the upper end of said cylinder unit.

13. In the clothes washing machine defined in claim 4, said agitator unit comprising a downwardly open tube surrounding said cylinder unit and said projections being circumferentially spaced fins having external clothes engaging edges inclined upwardly and inwardly from an annular clothes engaging zone adjacent the lower end of said tube.

14. In the clothes washing machine defined in claim 4, a water pumping piston element slidable within said cylinder unit in response to reciprocation of said agitator unit.

15. In the clothes washing machine defined in claim 14, said piston element being structurally independent of said agitator unit and freely displaceable within said cylinder unit.

16. In the clothes washing machine defined in claim 4, a free piston unit longitudinally displaceable within said cylinder unit in response to reciprocation of said agitator unit.

17. In the clothes washing machine defined in claim 16, said piston unit being a hollow water tight buoyant integral plastic element.

18. In the clothes washing machine defined in claim 16, means for preventing passage of the piston unit through the upper end of said cylinder unit.

19. In the clothes washing machine defined in claim 4, said agitator unit comprising a downwardly open tubular member and said projections being thin longitudinal fins having outer clothes engaging edges inclined upwardly and inwardly from an annular larger diameter zone at the lower end of said tubular member.

20. In the clothes washing machine defined in claim 4, said cylinder unit being a hollow tubular member having a laterally apertured portion at its lower end, and there being a pluarilty of laterally projecting external projections on said member adjacent said apertured portion for shielding said apertured portion against clogging by said clothes during the water intake period.

21. In the clothes washing machine defined in claim 20, said projections on said cylinder unit member being circumferentially spaced longitudinal ribs.

22. In the washing machine defined in claim 4, said cylinder unit consisting essentially of a hollow open ended tube of corrosion resistant material at the lower end of which is provided an integral laterally projecting annular rim adapted to overlie a surface at the bottom of said body of water and a plurality of circumferentially spaced longitudinal ribs extending between said rim and said tube, said ribs serving to space said rim longitudinally from the lower end of said tube so that said laterally apertured portion of the cylinder unit comprises the spaces between said ribs.

23. In the washing machine defined in claim 22, internal socket formations on said ribs and rim at the lower end of said cylinder unit for detachable assembly of said cylinder unit with a wash water container.

24. In the washing machine defined in claim 4, means for limiting downward movement of said agitator unit so that it will not block flow of water at said apertured portion of the cylinder unit.

25. In combination, a wash water container unit having side walls and a closed bottom, a cylinder unit adapted to be surrounded by the articles to be washed, cooperating means on the container bottom and the lower end of said cylinder unit for detachable locking fit upright mounting of said cylinder unit substantially centrally within said container unit, said cylinder unit being apertured at its lower end for water intake and discharge, and an agitator unit reciprocable on said cylinder unit and having circumferentially spaced inclined edge external longitudinal fins for engaging the surrounding articles of the wash water.

26. In the combination defined in claim 25, an integral hollow light weight piston unit freely reciprocable within said cylinder unit.

References Cited

UNITED STATES PATENTS

| 157,812 | 12/1874 | Goodnough et al. | 259—98 X |
| 201,926 | 4/1878 | Knight | 259—98 X |
| 764,613 | 7/1904 | Moreland | 259—98 X |
| 775,126 | 11/1904 | Cloutier | 68—215 |
| 901,313 | 10/1908 | Baker | 259—98 X |
| 2,497,300 | 2/1950 | Elliott | 103—52 X |
| 2,721,467 | 10/1955 | Modrey | 68—184 |
| 2,770,119 | 11/1956 | Walton | 68—54 X |
| 3,091,954 | 6/1963 | Bullock et al. | 68—18 |

FOREIGN PATENTS

| 519,599 | 1/1921 | France. |
| 1,084,099 | 6/1954 | France. |
| 566,352 | 12/1932 | Germany. |
| 827,488 | 1/1952 | Germany. |
| Ad. 879 | 1895 | Great Britain. |
| Ad. 5,410 | 1915 | Great Britain. |
| 501,284 | 11/1954 | Italy. |

WILLIAM I. PRICE, *Primary Examiner.*

U.S. Cl. X.R.

68—216; 103—52; 259—98